BRUCE E. DEAL
INVENTOR.
BY Roger S. Borovoy
Stuart Lubitz
ATTORNEYS

BRUCE E. DEAL
INVENTOR.

BY Roger S. Borovoy
Stuart Lubitz
ATTORNEYS

United States Patent Office 3,550,256
Patented Dec. 29, 1970

3,550,256

CONTROL OF SURFACE INVERSION OF P- AND N-TYPE SILICON USING DENSE DIELECTRICS

Bruce E. Deal, Palo Alto, Calif., assignor to Fairchild Camera and Instrument Corporation, Syosset, N.Y., a corporation of Delaware Filed Dec. 21, 1967, Ser. No. 692,490
Int. Cl. B01j *17/00;* H01g *13/00*
U.S. Cl. 29—571 11 Claims

ABSTRACT OF THE DISCLOSURE

A method and device is disclosed wherein the density of fast surface states is controlled. This is accomplished by depositing a thin layer of dense dielectric (e.g., silicon nitride, silicon monoxide or silicon carbide) over selected areas of a silicon oxide surface. The device is then thermally treated thereby reducing the density of fast surface states in areas that do not have a dielectric coating. Areas under the dielectric coating have a high density of fast surface states. The control of the density of the fast surface states enables the control and prevention of a formation of inversion layers.

BACKGROUND OF THE INVENTION

(1) Field of the invention

This invention relates to the control of fast surface state densities at selected portions of a semiconductor device.

(2) Description of the prior art

With respect to a prior art metal-insulator-silicon construction, it is well known that when a voltage (of the same polarity as the majority carriers in the silicon) equal to or larger than a particular voltage is applied to a field plate or a conductor above the insulator layer, an inversion layer is created in the semiconductor material in a region coincident with the conductor. This effect has been advantageously employed to form a MOST (metal-oxide-silicon-transistor). It is an impediment in other instances where the inversion layer conductively couples (shorts) two regions that were intended to be isolated. For example, in integrated circuit technology, many individual devices will be located in close proximity to one another on a single silicon chip. Further, many metal connections go from one device to the next over the passivating oxide layer and extend over the isolating portion of devices. These metal strips carry voltages high enough to invert the underlying silicon if the voltage is positive and the silicon is P-type or if the silicon is N-type and the voltage is negative. The inversion layer may connect the adjacent devices and create a short circuit.

In the case of reverse-biased junctions of individual devices, the inversion layer may form a field induced junction which has a depletion region and an electric field associated therewith. At the corner of the field induced junction and near the surface thereof, the electric field is at a high intensity whereby breakdown of the field induced junction may occur at a voltage substantially lower than the breakdown voltage of the original P-N junction. Thus, the formation of an inversion layer and the breakdown of the junction formed thereby tends to create erratic device performance.

Prior art methods of preventing inversion layers (and low breakdown) employ channel stops. The channel stop regions completely surround the device and are of the same conductivity type as the silicon crystal (for example, P-type) but have a higher impurity concentration. The higher concentration of impurity requires a much higher inversion voltage and consequently contains any inversion. However, these regions of heavily doped silicon use up considerable space and are difficult to prepare (i.e., extra process step of a precise nature).

SUMMARY OF THE INVENTION

The method of the present invention solves the prior art's problem by making possible the control of fast surface states in selected regions of the semiconductor surface. In the region of the fast surface states inversion layers are controlled or not formed beneath except upon the application of very high voltages.

Briefly, the method of the present invention comprises a method of preventing inversion of a silicon surface by forming a layer of a dense dielectric (e.g., silicon nitride, silicon monoxide or silicon carbide) over a passivating layer into a predetermined pattern and thermally treating the silicon, the passivating layer and the dielectric layer at predetermined thermal and atmospheric conditions such that a high density of fast surface states is created at the silicon-passivating layer interface.

The above described invention is a method for preventing the surface inversion of silicon wafers having thermal oxide passivating layers. The method is advantageous in that it is no longer necessary to use channel stops as they were used in prior art devices. The method provides a way of controlling the fast surface charge state densities in pre-selected areas of the wafer. By additional steps the surface charge states may be decreased in other areas of the wafer. Thus, a device may be provided having high density fast surface charge state areas requiring a relatively high voltage to produce surface inversion, and having other areas which require a lower voltage to induce inversion. It is recognizable that the prevention of inversions in certain devices increases breakdown voltage. In other devices it prevents shorts.

Another advantage of the invention is that the fixed surface charge, $Q_{ss}$, of areas unprotected by a (dense dielectric) coating can be controlled by various heat treatments which, when a dielectric coating is employed, do not effect the fast surface charge states in the protected regions. Even a very thin layer of a dielectric like silicon nitride can prevent the fast surface charge state from being annealed out and the underlying silicon surface will not become inverted by a field plate or gate voltages in excess, for example, of a hundred volts.

DESCRIPTION OF THE PREFERRED EMBODIMENTS

This invention can be better understood by first considering certain of the background facts and discoveries which led thereto.

Figure 1A:
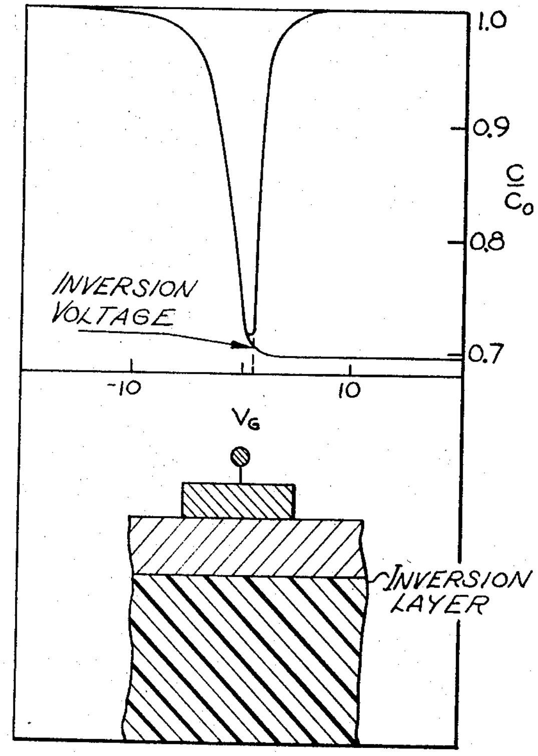
FIG. 1*a* is a capacitance-voltage curve shown in conjunction with a silicon surface depicted in diagrammatic form showing that with no fast states, the silicon surface may be inverted with application of +2 volts or more at the metal field plate.
Figure 1B:
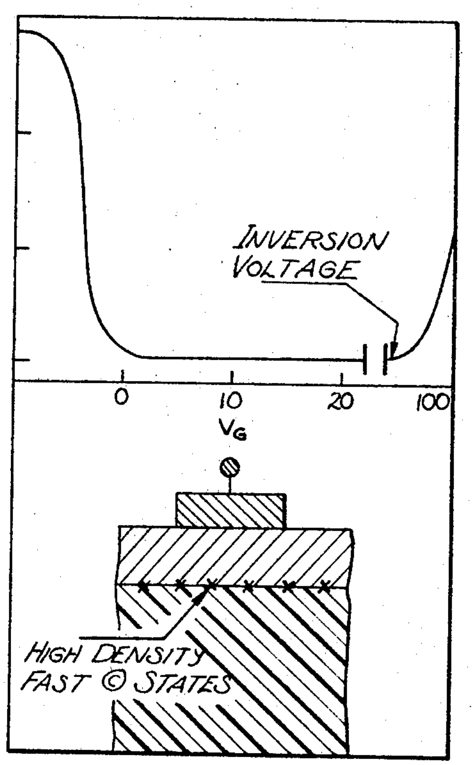
FIG. 1*b* is a capacitance-voltage curve showing the effect of fast surface charge states on inversion of a silicon surface, i.e., silicon surface is inverted only if +90 volts or greater is applied at the metal field plate.

The thermal oxidation of silicon, that is, the process by which silicon is converted to a $SiO_x$ by reaction with oxygen or water at temperatures in the range of 900°–1200° C. has been found to result in various types of surface charges being associated with the thermal oxidation layer and the silicon-oxide interface. Types of charges which are of concern in the present invention are the fixed surface state charge, $Q_{ss}$, of which a typical concentration range is $10^{10}$–$10^{12}$ charges per centimeter$^2$ and the fast surface charge states, $N_{st}$, of which the typical concentration range is $10^9$–$10^{13}$ charges per centimeter.$^2$ Fast surface states, $N_{st}$ have the property of being charged and discharged at particular applied voltages or surface potentials; thus they will cause a distortion in a capacitance-voltage plot (C–V plot) as seen by comparing FIGS. 1*a* and 1*b*. FIG. 1*a* shows the C–V plot without the fast surface states and FIG. 1*b* shows the C–V plot with the fast surface states present. These fast states associated with the thermally oxidized silicon structure have been found to occur at various energy levels. One of these fast states, arbitrarily designated the © state, causes a broadening of the C–V curve as shown in FIG. 1*b*. This © state is of most importance in this discussion. The probable physical location of the arbitrarily designated © states in a thermally oxidized silicon structure is shown in FIG. 1*b* to be at the oxide-silicon interface. It should be noted that for a low © state density, the C–V plot is identical to a theoretical plot that is shifted along the voltage axis due to $Q_{ss}$ (i.e., fixed surface state charge). For a P-type sample of silicon, as little as +2 volts applied to the field plate will invert the underlying silicon surface. This condition results after alloying a normal MOS structure (no nitride layer). However, FIG. 1*b* shows an MOS C–V plot and structure with a high density of © surface state charge. Now the inversion point is obtained only after application to the field plate of a much higher voltage than the +2 to +5 volts generally required (i.e., in FIG. 1*b* approximately 90 volts is required to cause inversion). It is thought that this additional voltage is required to charge the fast surface states before a negative charge can be induced in the silicon surface.

Exactly the same effect will occur for N-type silicon except that charge signs will be reversed. As with P-type silicon, the annealing out of fast © states will be prevented by a thin nitride layer over the oxide. It will now take large negative bias on the field plate to invert the N-type surface.

It has been found that the gate voltage and thus the surface potential which corresponds to the inversion point of the silicon surface of a metal-oxide-silicon structure is directly related to the density of the fast surface states at the passivating oxide-silicon interface, (i.e., © state density). In other words, the greater the fast surface state density, the higher is the voltage required to invert the silicon surface.

After the thermal oxidation of a silicon wafer, cooling in a dry ambient will yield larger fast surface state densities (e.g., five parts per million of water will give $$5\times10^{12}\text{cm}^{-2}N_{st}$$

charges), than wafers treated in an ambient containing moisture ($N_{st}<1\times10^{11}$cm.$^{-2}$). The high © state density can be annealed out (essentially eliminated) by the standard aluminum alloy heat treatments at 550° C. for two minutes in dry nitrogen. This annealing will occur if an aluminum layer is in contact with the silicon oxide layer, or if sufficient hydrogen is present in the ambient, in the temperature range of from 300°–600° C. Without aluminum over the oxide or the presence of hydrogen, the annealing of the © states occurs at a much higher temperature and/or much longer exposure times.

The discovery has been made that a dense dielectric layer, preferably silicon nitride, deposited over a thermally oxidized silicon structure can prevent subsequent annealing or reduction of fast surface state densities at the silicon-silicon oxide interface. When the nitride coating has been applied to the thermal oxide, even with aluminum plates in contact with the nitride oxide layer, the fast surface states are not eliminated at annealing temperatures below 600° C. This also appears to be true of layers of silicon carbide, and silicon monoxide although they may not be as effective as silicon nitride. It has been found that nitride layers as thin as a few hundred angstrom units are sufficient to prevent the elimination of fast surface states.

It has also been found that not only can fast surface states formed prior to the nitride deposition be protected by the nitride, but also fast surface states can be produced under the silicon oxide layer after nitride deposition, with appropriate high temperature treatments, at above 800° C.

Referring now to FIGS. 2*a*–2*d*, there is shown a method for forming an integrated circuit structure where a silicon nitride layer deposited over a thermal oxide layer prevents the inversion of the silicon between active devices. It should be understood that silicon nitride is preferred but silicon carbide and silicon monoxide as well as other similar dielectrics are within the broad scope of this invention. The invention is applicable to single devices as well as to integrated circuits.

Figure 2A:
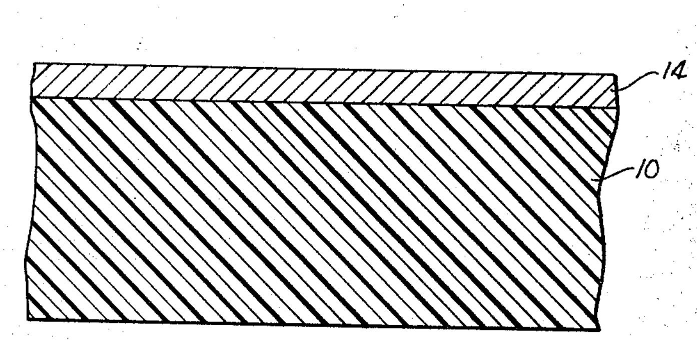
FIGS. 2*a*–2*d* are diagrammatic representations of steps in the invented method.

The first step in the method of the present invention is to thermally grow a silicon oxide layer 14 on a silicon wafer 10 (FIG. 2*a*). The invention may also be employed in connection with protective or oxide layers formed by chemical methods, pyrolysis, or other processes and combinations of those.

Figure 2B:
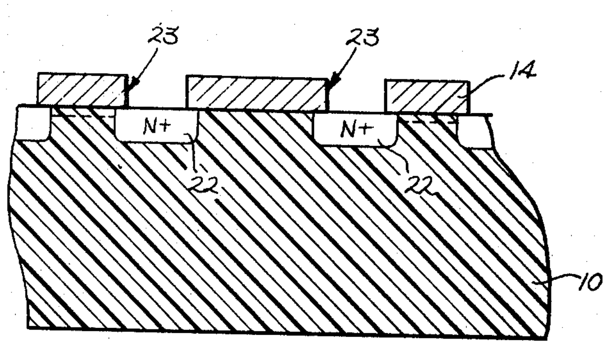

The oxide 14 on the silicon wafer is next etched using standard photoengraving techniques thus providing openings 23 for subsequent diffusions (FIG. 2*b*). After etching, diffusion can be carried out with any of the desired dopants such as boron or phosphorus to provide source and drain regions. Such photoengraving and diffusion steps may be repeated a number of times depending on the particular device being formed. In addition, various steps may be performed to isolate the devices being formed. This is well known technology as is forming of the oxide by other techniques such as vapor deposition, sputtering, etc.

Figure 2C:
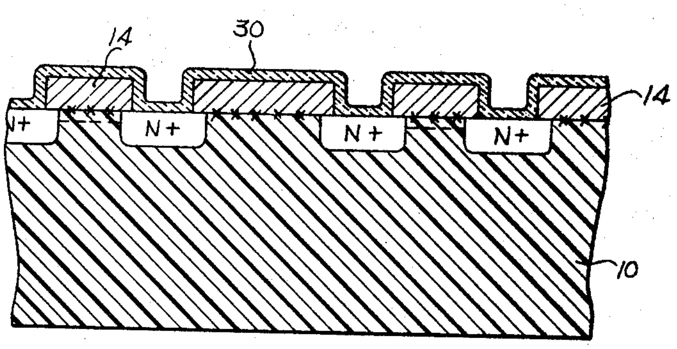

Next, a layer of silicon nitride 30 is deposited over the oxide layer 14 (FIG. 2*c*). This layer can be deposited to any desired thickness. A convenient thickness that has been found to give good results is approximately 0.10 micron. Layers of silicon nitride as thin as a few hundred angstroms have been found to perform satisfactorily in the present invention. The silicon nitride can be vapor deposited at 900° C. using the $SiCl_4$ (or $SiH_4$)$+NH_3+H_2$ reaction. Other methods of depositing a silicon nitride layer upon the silicon oxide layer can, of course, be used. It has been discovered that the effectiveness of the formed silicon nitride layer in preventing or controlling the removal of fast states appears at least in part to be determined by the density of the nitride. The more dense the nitride the more effective it is in maintaining the fast surface states. The density of the nitride may be controlled by adjusting the ratio of materials employed in the deposition (e.g., ratio of silicon tetrachloride and ammonia), the total flow rate of these materials or the temperature at which the process takes place.

Using vapor photoresist techniques, the nitride is selectively removed from regions of the oxide layer covering active devices. Since silicon nitride films are difficult to etch and can be etched only slowly, the following photoresist procedure for a nitride film over silicon oxide has been employed. First, a thin layer of silicon oxide is vapor deposited over the nitride film, the oxide layer being about 0.2–0.5 micron thick. Conventional photoresist is then used to open a pattern in the vapor deposited silicon oxide. The photoresist is removed and the opened pattern is then exposed to boiling phosphoric acid which etches away the exposed portion of the nitride layer. The vapor deposited oxide layer is left intact, but can later be etched off.

The wafer is then annealed in a dry ambient at elevated temperature conditions sufficient to produce high fast surface state charge densities. Typical annealing conditions are 1000° C. for 20 minutes with a two minute pull. This thermal treatment results in large fast surface state densities along the entire silicon-silicon oxide interface.

Figure 3:
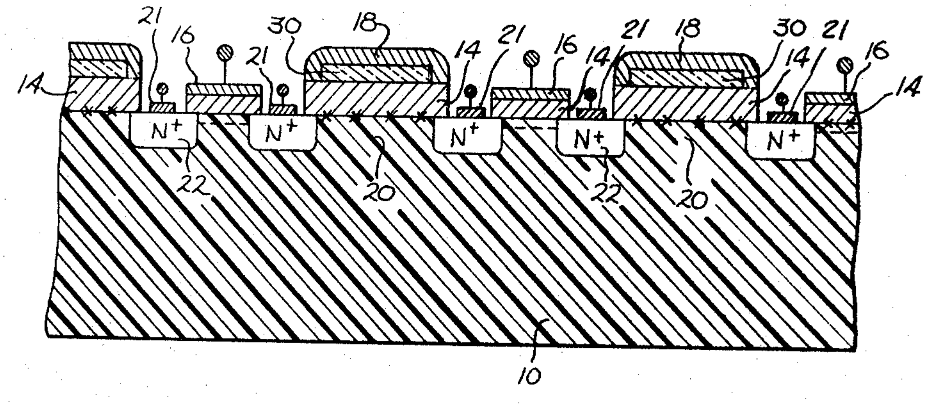
FIG. 3 is a section in diagrammatic form of an integrated circuit structure employing the present inevntion.
Figure 2D:
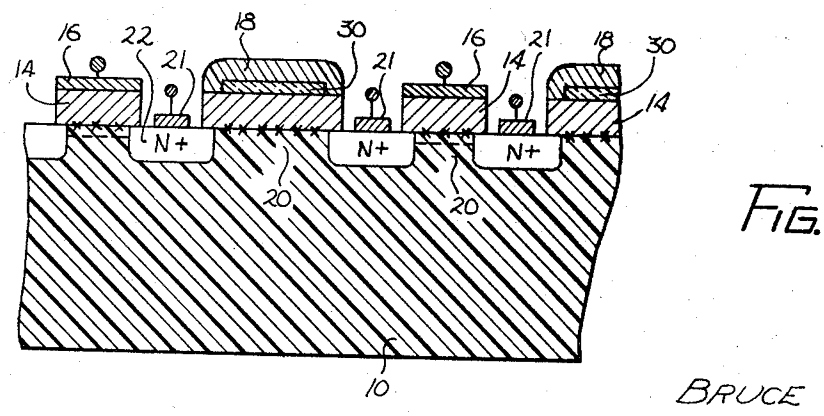

Openings are next etched through the oxide 14 to enable electrical contact to the silicon. A conductive metal, preferably aluminum, is then evaporated and deposited (using standard metal evaporating techniques) for contacts 21, gates 16 and conductors 18 over the entire wafer (FIGS. 2*d* and 3). The conductive metal is then pre-alloyed at the appropriate heat treating conditions. When aluminum is used, typical pre-alloying conditions of 300° C.–575° C. for two to ten minutes in dry nitrogen is used. This heat treatment eliminates the fast surface states underlying covered regions of the thermal oxide layer not covered by nitride. Alternatively, the wafer can be treated in hydrogen or water at 300° C. from ten to thirty minutes to eliminate the fast surface states in regions not covered by nitride.

Using photoresist techniques, undesired aluminum is etched away. A final alloying step at 500° C.–575° C. for two to ten minutes under dry nitrogen ambient may then be undertaken. The final alloying step is not always required. It has been found that in the presence of aluminum and under the thermal conditions encountered during pre-alloying and alloying, that fast surface states are eliminated from a non-nitride covered silicon-silicon oxide interface.

The fixed surface state charge density $Q_{ss/q}$ can be controlled reproducibly by a final high temperature thermal treatment of a device. If the oxidized silicon structure is pulled rapidly from a dry $O_2$ oxidizing ambient, then the temperature from which it is quenched determines the $Q_{ss/q}$ value. While the $Q_{ss/q}$ surface state charge density can be controlled by high temperature treatments, treatment in nitrogen at lower temperatures in the presence of aluminum will eliminate fast surface state charges at the silicon-silicon oxide interface. However, when a silicon nitride layer is evaporated and deposited over the thermal oxide layer of a device, the thermal treatments used to control $Q_{ss/q}$ do not affect the fast surface charge states beneath the nitride alyer. Thus, $Q_{ss}$ density in one area of a device can be controlled without eliminating fast surface state charges from another area of the device.

Referring now to FIG. 3, there is shown a typical integrated circuit structure incorporating the invention. The monocrystalline silicon wafer 10 which is employed may be of the P- or N-type. A plurality of regions 22 having an opposite conductivity type are located within wafer 10 and have junctions extending to the surface thereof. A passivating layer of thermal oxide 14 (e.g., $SiO_x$) is located over the surface of wafer 10 to protect the junctions. A silicon nitride layer 30 is located over the thermal oxide layer 14 in selected regions. The thickness of silicon nitride layer 30 may vary from between a few hundred angstroms to any convenient thickness up to about 5000 angstroms or greater. With present processes at thicknesses above approximately 5000 angstroms, crazing usually becomes intolerable. A typical thickness of the silicon nitride layer is 0.1 micron. Openings are provided in the silicon nitride layer 30 and underlying silicon oxide layer 14 to enable contact to be made to regions 22. A conductive metal layer forms metal field plates 16, conductors 18 and contacts 21. During the alloying process, the fast surface energy states in areas which are not covered by silicon nitride layers are essentially eliminated. However, in those areas 20, which have a dense silicon nitride film thereover (such as under metal current carrying strips 18) the fast surface states remain and prevent inversion of the silicon surface underlying those areas. Areas under the fast surface states 20 act as separators for active region 22 of an integrated circuit and prevent inversion of the underlying surface; thus they act as "channel stops."

Although this invention has been disclosed and illustrated with reference to particular applications, the principles involved are susceptible of numerous other applications which will be apparent to those skilled in the art. The invention is, therefore, to be limited only as indicated by the scope of the appended claims.

What is claimed is:

1. The method of selectively preventing surface inversion of silicon having a passivating layer over at least a part of its surface comprising the steps of:

forming a layer of dense dielectric material over said passivating layer into a predetermined pattern, thermally treating said silicon, said passivating layer and said dielectric layer at predetermined thermal and atmospheric conditions such that a high density of fast surface states is created at the silicon-passivating layer interface; and, thermally treating said silicon and said passivating layer at predetermined thermal and atmospheric conditions such that the fast surface states in areas having no dense dielectric layer are decreased and the fast surface states in areas beneath the dense dielectric layer remain substantially unaltered.

2. The method recited in claim 1 including the additional step prior to the second thermal treating step of:

evaporating and depositing a layer of metal over the dielectric layer and passivating layer.

3. The method recited in claim 2 wherein said dielectric is selected from a group consisting of silicon nitride, silicon carbide, and silicon monoxide.

4. The method recited in claim 1 wherein said dielectric is silicon nitride.

5. The method recited in claim 3 wherein said passivating layer is silicon oxide.

6. The method as described in claim 3 wherein said deposited metal layer is aluminum.

7. The method as described in claim 3 wherein the thermal treatment for decreasing fast surface states comprises heating the wafer at a temperature of above approximately 300° C. for two to ten minutes in dry nitrogen.

8. The method as described in claim 3 wherein the thermal treatment for decreasing fast surface states comprises treating the wafer in water vapor at 250°–550° C. for ten to thirty minutes.

9. The method as described in claim 3 wherein the thermal treatment for decreasing fast surface states comprises treating the wafer in hydrogen gas at 250°–550° C. for ten to thirty minutes.

10. The method described in claim 3 wherein said thermal treatment to decrease fast states substantially eliminates such states in areas of the silicon-passivating layer interface over which there is no dielectric layer.

11. A method of controlling fixed surface charge states and fast surface charge states on a silicon device comprising the steps of:

providing a passivating oxide layer over a silicon surface;

forming a layer of silicon nitride over said passivating layer into a predetermined pattern;

thermally treating said silicon, said passivating layer and said silicon nitride coating at predetermined thermal and atmospheric conditions such that a high density of fast surface states is created in a first selected area at the silicon-passivating layer interface;

thermally treating said silicon, said passivating layer and said silicon nitride coating such that a predetermined density of fixed surface charge states $Q_{ss}$ are formed at a second selected area at the silicon surface, whereby the fast surface charge states in said first selected areas are not annealed by the thermal treatments for forming fixed surface charge states.

References Cited

UNITED STATES PATENTS

| | | | |
|---|---|---|---|
| 2,817,613 | 12/1957 | Mueller | 29—576T |
| 3,311,756 | 3/1967 | Nagata et al. | 29—571 |
| 3,387,358 | 6/1968 | Heiman | 29—571 |

JOHN F. CAMPBELL, Primary Examiner

W. TUPMAN, Assistant Examiner

U.S. Cl. X.R.

29—576